United States Patent [19]

Karlinski

[11] Patent Number: 4,852,790
[45] Date of Patent: Aug. 1, 1989

[54] APPARATUS AND METHOD FOR CONTINUOUS MANUFACTURE OF ARMORED OPTICAL FIBER CABLE

[75] Inventor: Herbert E. Karlinski, San Diego, Calif.

[73] Assignee: K-Tube Corporation, San Diego, Calif.

[21] Appl. No.: 164,385

[22] Filed: Mar. 4, 1988

Related U.S. Application Data

[60] Division of Ser. No. 75,839, Jul. 16, 1987, Pat. No. 4,759,487, and a continuation-in-part of Ser. No. 23,927, Mar. 9, 1987, abandoned, which is a continuation of Ser. No. 802,853, Nov. 27, 1985, abandoned.

[51] Int. Cl.⁴ .................. B23K 31/06; B23K 26/02; B23P 19/04; B21D 39/00
[52] U.S. Cl. ..................... 228/148; 29/728; 72/52; 228/17.5
[58] Field of Search .................. 29/33 D, 33 E, 33 Q, 29/460, 728; 72/51, 52, 368; 156/52–54; 219/121 LC, 121 LD; 228/17.5, 126, 127, 129, 130, 131, 146–148, 151; 350/96.23

[56] References Cited

U.S. PATENT DOCUMENTS

| | | | |
|---|---|---|---|
| 1,877,621 | 9/1932 | Anderson | 228/151 |
| 4,152,573 | 5/1979 | Saurin et al. | 228/151 X |
| 4,214,693 | 7/1980 | Smith | 228/148 |
| 4,232,935 | 11/1980 | Rohner et al. | 350/96.23 |
| 4,573,253 | 3/1986 | Smith et al. | 29/460 |

FOREIGN PATENT DOCUMENTS

| | | | |
|---|---|---|---|
| 633623 | 12/1961 | Canada | 228/148 |
| 54-32154 | 3/1979 | Japan | 219/121 LD |

*Primary Examiner*—E. Michael Combs
*Attorney, Agent, or Firm*—Woodard, Emhardt, Naughton Moriarty & McNett

[57] ABSTRACT

An apparatus and method for continuously manufacturing optical fiber cable in which optical fiber is encased by an hermetically sealed homogeneous metal tube formed from flat metal strips. A first assembly of mating rollers having successively different shapes forms the flat metal strip into a partially formed tube having a longitudinal gap. Optical fiber is guided through the gap to lie within the partially formed tube. The tube is then closed by a second assembly of mating rollers having successively different shapes. A laser beam is used to weld the seam closed without filler metal and without heat shielding between the seam and the optical fiber. The finished tubing with optical fiber therein is sunk by being drawn through wire dies to reduce the diameter. A wheel draws the tubing through the apparatus at constant speed to effect a uniform weld line. In another embodiment, an introducer tube of smaller diameter than the hermetically sealed homogeneous metal tube extends within the metal tube to about the point of tangential approach of the metal tube to the wheel. Gas flows through the introducer tube to carry the optical fiber by viscous drag and blow the optical fiber against the outer circumference of the metal tube as the metal tube wraps around the wheel.

8 Claims, 9 Drawing Sheets

APPARATUS AND METHOD FOR CONTINUOUS MANUFACTURE OF ARMORED OPTICAL FIBER CABLE

REFERENCE TO RELATED APPLICATIONS

This application is a division of application Ser. No. 075,839 filed July 16, 1987, now U.S. Pat. No. 4,759,487, and a continuation-in-part of U.S. patent application Ser. No. 023,927, filed on Mar. 9, 1987, abandoned which is a file-wrapper-continuation of U.S. patent application Ser. No. 802,853, filed on Nov. 27, 1985 abandoned.

BACKGROUND OF THE INVENTION

The present invention relates generally to the manufacture of optical fiber cable, and more specifically to the continuous manufacture of armored optical fiber cable in which the optical fiber is encased within an hermetically sealed small diameter metal tube.

One use of armored optical fiber cables is for communication transmission lines which are often many kilometers in length and exposed to a variety of mechanical and chemical environmental hazards. Because of the length of such cables and the difficulty and expense of field splicing optical fiber cables, it is desirable to manufacture such cables in long continuous lengths, rather than in relatively short discrete lengths. Additionally, it is desirable that the armor tube of armored optical fiber cables be strong and well sealed. Preferably, the armor should be made of a material, such as stainless steel, which is both strong as to its physical characteristics and resistant to chemical attack.

One problem associated with the manufacture of continuous lengths of armored optical fiber cable is that long lengths of optical fiber cannot easily be inserted longitudinally into the bore of similarly long ready-made seamless tube. Consequently, for the manufacture of long lengths of cable, the optical fiber must be introduced into the armor tube as the tube is formed, resulting in a longitudinal seam in the armor tube which preferably is sealed by some means.

A variety of approaches have been proposed for sealing the seam of the armor tube of an armored optical fiber cable. The predominate sealing method as shown by patents issued in the optical fiber cable art is the application of molten solder to the seam, whereupon the solder wicks into the joint and effects a seal. Soldering is disclosed as the preferred sealing means in such representative references as U.S. Pat. Nos. 4,508,423, issued to Winter et al.; 4,555,054 issued to Winter et al.; 4,557,559 issued to Winter; and 4,573,253 issued to Smith et al. Winter et al. U.S. Pat. No. 4,508,423 and 4,555,054 prefer to also use a heat-protective sheath surrounding the optical fibers at the soldering station to protect the optical fibers from the heat of soldering, with Winter et al. U.S. Pat. No. 4,555,054 disclosing this in the context of small diameter optical fiber cables. Winter U.S. Pat. No. 4,557,559 does not specifically describe the preferred soldering station, but refers to the soldering method of Winter et al. U.S. Pat. No. 4,508,423 as being suitable. Smith et al. discloses that it is preferred to pass the tube rapidly through molten solder, in contact therewith for only a fraction of a second, in order to reduce the risk of heat damage to the optical fibers. Hence, it would appear that there is an industry recognition of the risk of damage to the optical fibers from excessive heat during the seam sealing operation, and consequently the heretofore preferred method of effecting the seal was with solder, either in combination with a heat shield or with minimal exposure time to the solder.

Unfortunately, soldered seams do not possess as much strength and assurance of hermeticity as is desirable, because of the disimilarity of material between the tube and the solder, and because solder alloys in most cases are not as strong as the metal from which the tube is made, such as stainless steel.

It would be desirable to seal the seam by means of welding, such that the tube and the seam seal are of like material, resulting in a homogeneous sealed tube of uniform high strength. Winter U.S. Pat. No. 4,557,559 mentions welding as an alternative sealing means, but provides no specific disclosure of welding means which would be suitable for sealing armored optical fiber cables. Likewise, U.S. Pat. No. 4,232,935 issued to Rhoner et al. generally discloses a welded seam made by a welding machine, but provides no specific disclosure of a suitable welding means in light of the recognized risk of heat damage to the optical fibers when sealing optical fiber cables. Hence, Winter U.S. Pat. No. 4,557,559 and Rhoner are believed to disclose only the desirability of welding the seam, but provide no teaching as to a welding apparatus which would actually accomplish the purpose of sealing an optical fiber cable without damaging the optical fibers therein.

The present invention does not suffer from the above-mentioned limitations of the conventional solder method of sealing small diameter optical fiber cable armor tubes, yet permits welding of the tube seam without damage to the optical fiber within, even in the absence of a heat shield material located between the optical fiber and the tube seam during welding. An important component of the present invention is a beam of laser light, which is used to weld the tube seam, which method of seam sealing is believed to be novel in the optical fiber cable manufacturing art. Use of a laser results in a relatively fine and smooth weld line on the outer surface of the optical fiber cable armor tube, and the inner surface of the tube remains smooth at the weld site. Furthermore, the heat applied by the laser is highly localized and intense, permitting welding of the seam without overheating the optical fiber located within the tube.

SUMMARY OF THE INVENTION

One aspect of the present invention involves an apparatus for continuous manufacture of optical fiber cable in which optical fiber is encased by an hermetically sealed homogeneous metal tube formed from flat metal strip. The apparatus includes a first assembly of successively aligned roller pairs for receiving the metal strip and successively forming the metal strip into a partially closed tube having a longitudinal gap at the top thereof. Optical fiber guide means are provided for continuously receiving and guiding optical fiber through the longitudinal gap at the top of the partially closed tube to lie within the partially closed tube at a location past the first assembly of roller pairs. A second assembly of successively aligned roller pairs are provided for receiving the partially closed tube with optical fiber therein and successively forming the partially closed tube into completely closed tube in which the edges of the formerly flat steel strip abut at a seam at the top of the tube. A laser welding station is provided having means for directing a beam of laser light onto the abutted edges of the tube seam at a location where the optical fiber lies within the tube adjacent the seam without heat shielding intermediate the optical fiber. The laser welding station includes means for focusing the beam of laser light such that the focal point is located above the surface of the seam, for conduction welding the seam together without filler metal, thereby creating a homogeneous tube having an hermetically sealed seam. The laser welding station also includes an upper guide roller and a lower guide roller for engaging the completely closed tube therebetween before the tube encounters the beam of laser light, the upper guide roller being fixed in relationship to the focal point of the beam of laser light and the lower roller being spring biased upwards, thereby maintaining the seam of the tubing in fixed relation to the focal point of the laser beam despite transient variations in diameter of the tube. Means, located past the laser welding station, are provided for continuously drawing the metal strip through the first and second assemblies of roller pairs and the welding station.

Another aspect of the present invention involves optical fiber introduction means for continuously introducing optical fiber through the longitudinal gap at the top of the partially closed tube, the optical fiber introduction means including an introducer tube of smaller diameter than the hermetically sealed homogeneous metal tube which extends within the metal tube to about the point of tangential approach of the metal tube to a capstan which is part of the drawing means, and including means for causing gas to flow through the introducer tube to carry the optical fiber by viscous drag and blow the optical fiber against the outer circumference of the tube as the tube engages the capstan.

Another aspect of the present invention involves a gel introducer tube which enters the the longitudinal gap at the top of the partially closed tube, the introducer tube being of smaller diameter than the hermetically sealed homogeneous metal tube, and extending within the metal tube beyond the point of tangential approach of the metal tube to the capstan, and including means for causing gel to flow through the gel introducer tube.

It is an object of the invention to provide an apparatus and method for manufacturing on a continuous basis optical fiber cables in which optical fiber is encased by an hermetically sealed homogeneous metal tube formed from flat metal strip.

It is a further object of the present invention to provide an optical fiber cable in which the length of the optical fiber exceeds the length of the outer tube armor, the optical fiber thereby assuming a sinusoidal disposition within the armor tube such that the optical fiber is not subject to strain damage from tension.

Further objects and advantages of the invention will become apparent from the description and drawings below.

BRIEF DESCRIPTION OF THE DRAWINGS

FIGS. 1 and 2 should be laid side-by-side, with FIG. 1 to the left and FIG. 2 to the right, to view the two portions in their actual relationship.

FIGS. 10 and 11 should be laid side-by-side, with FIG. 10 to the left and FIG. 11 to the right, to view the two portions in their actual relationship.

DESCRIPTION OF THE PREFERRED EMBODIMENT

For the purposes of promoting an understanding of the present invention, reference will now be made to the embodiment illustrated in the drawings and specific language will be used to described the same. It is nevertheless to be understood that no limitation of the scope of the invention is thereby intended, the proper scope of the invention being indicated by the claims appended below and the equivalents thereof.

Figure 1:
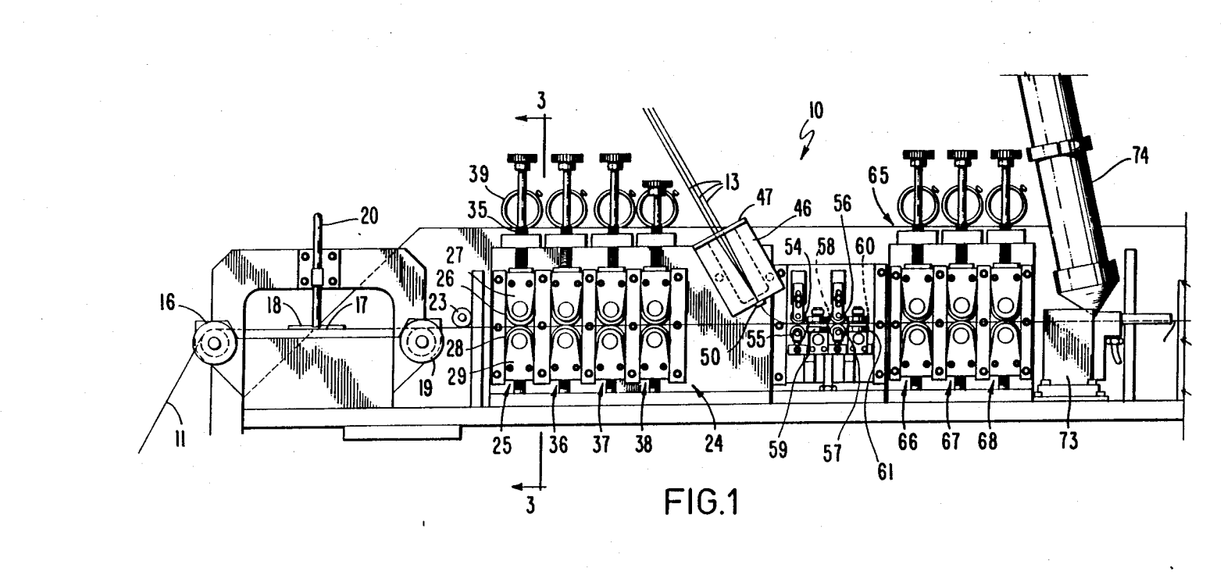
FIGS. 1 and 2 are elevational views of separate portions of an apparatus made in accordance with the present invention. For clarity, the apparatus of FIGS. 1 and 2 has been broken into separate left and right portions, and illustrated in two figures.
Figure 2:
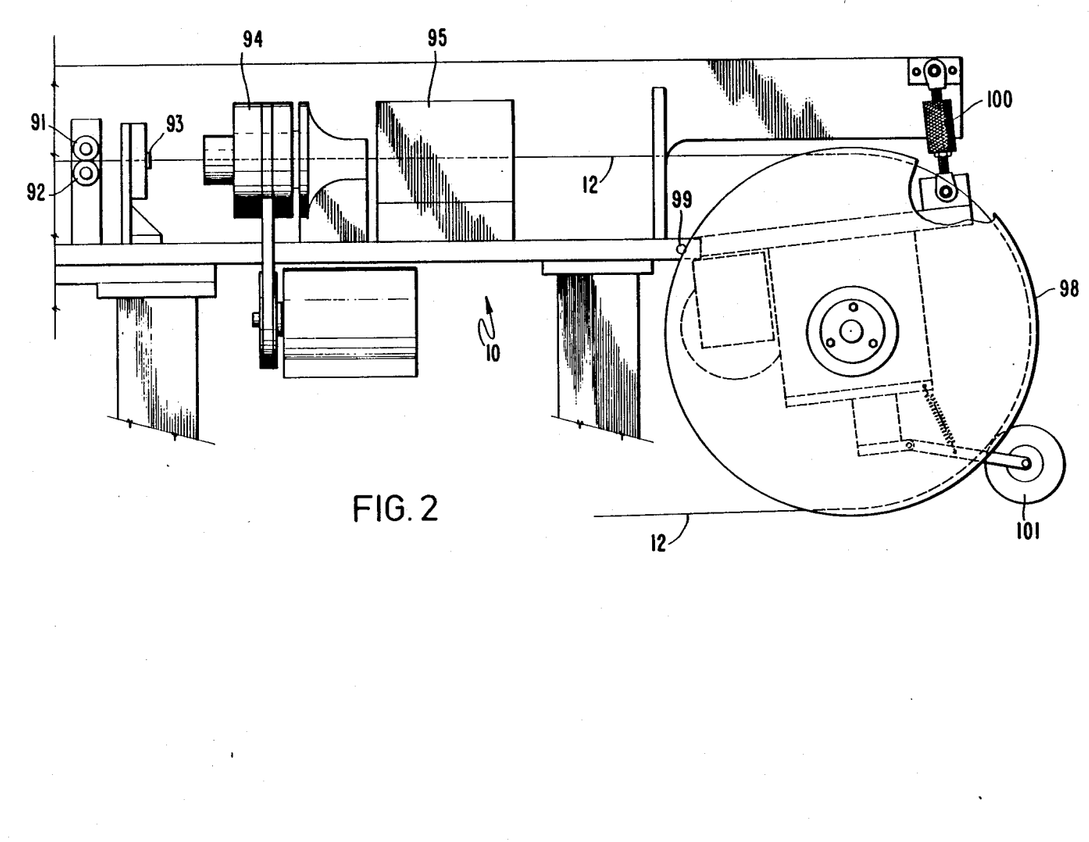
Figure 8:
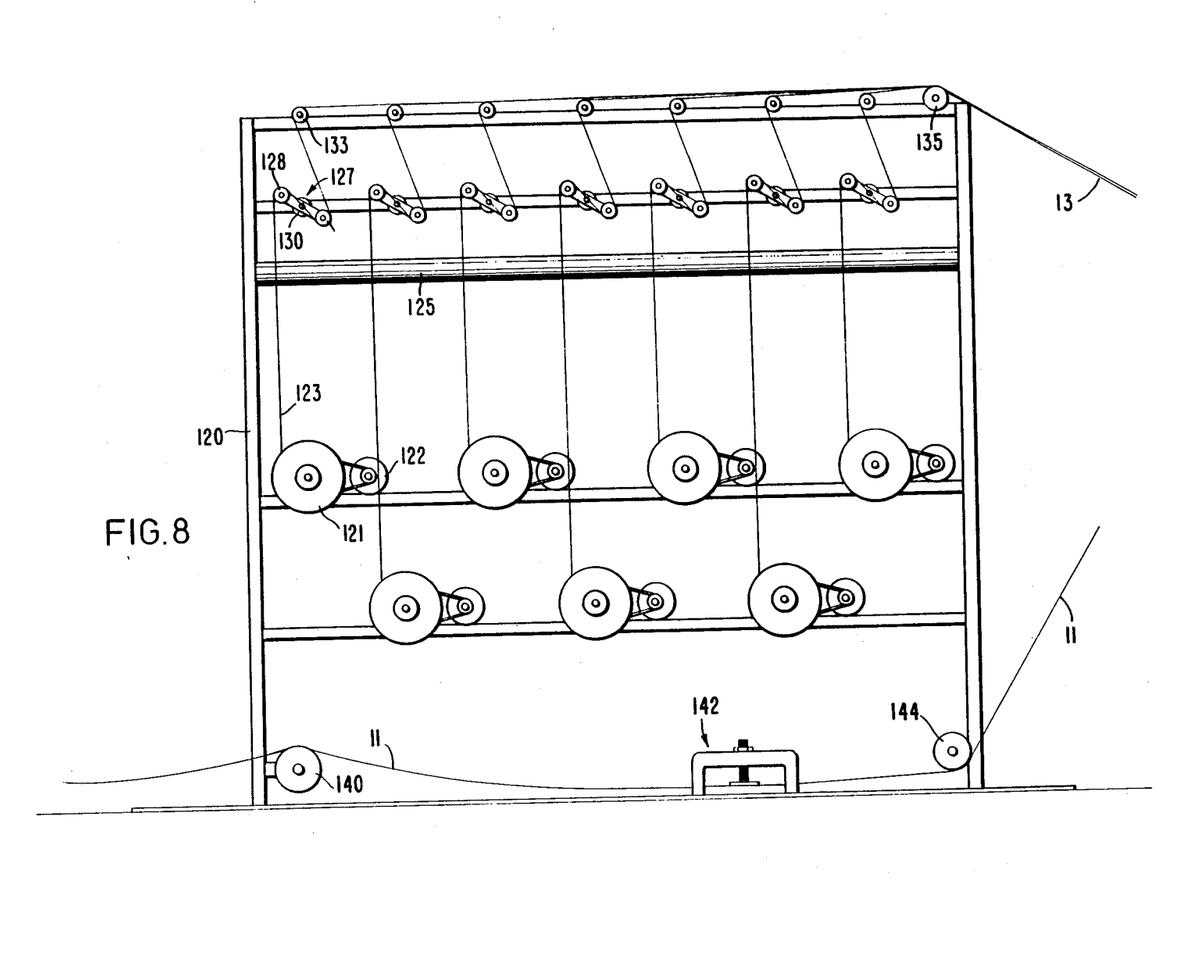
FIG. 8 is an elevational view of the optical fiber supply tension control apparatus used in conjunction with the apparatus of FIGS. 1 and 2. The apparatus of FIG. 8 is located to the left of the apparatus shown in FIG. 1.
Figure 10:
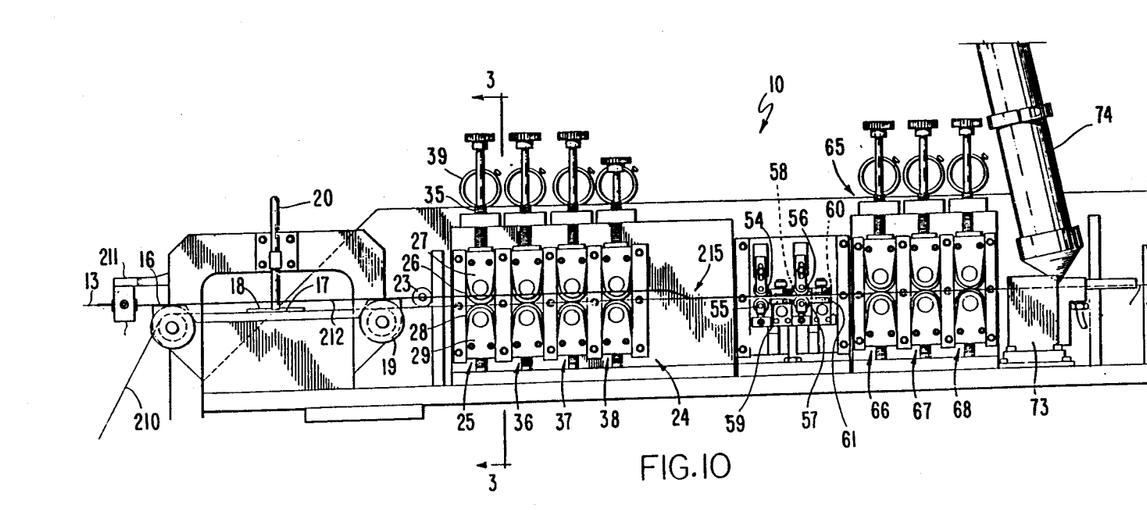
FIGS. 10 and 11 are elevational views of separate portions of a second embodiment of an apparatus made in accordance with the present invention. For clarity, the apparatus of FIGS. 10 and 11 has been broken into separate left and right portions, and illustrated in two figures.
Figure 11:
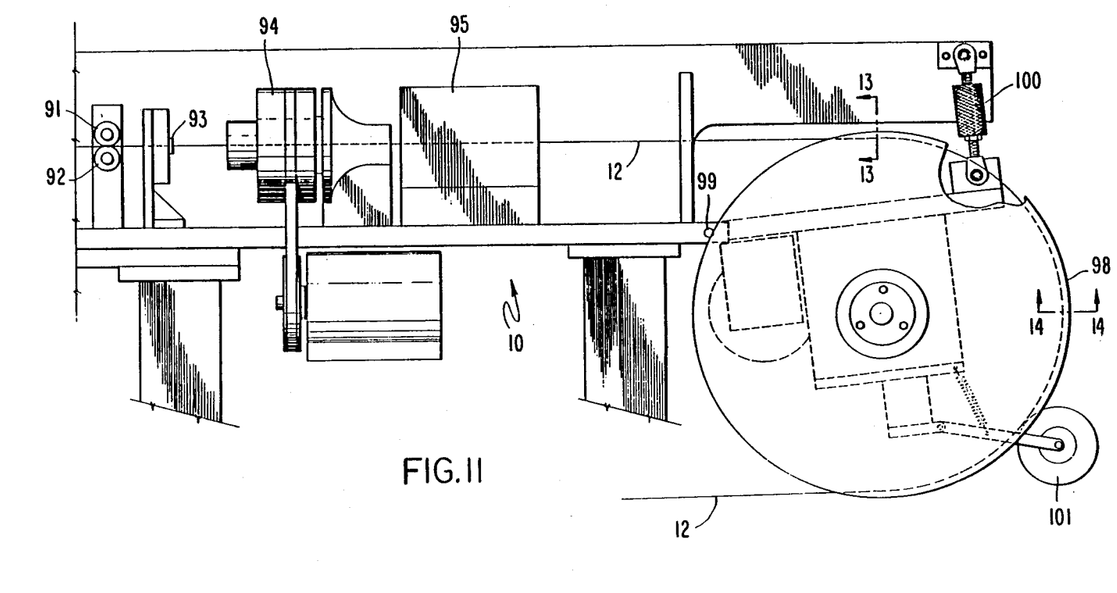
Figure 12:
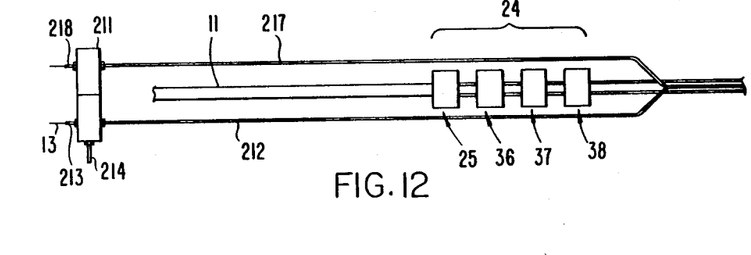
FIG. 12 is diagramatic plan view of portions of the apparatus of FIG. 10, showing the relative relationships of certain elements of the apparatus of FIG. 10.
Figure 13:
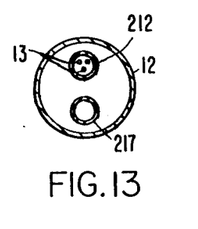
FIG. 13 is a cross-sectional view of the optical fiber cable and certain structure of the apparatus of FIGS. 10 and 11 as viewed along section line 13—13.
Figure 14:
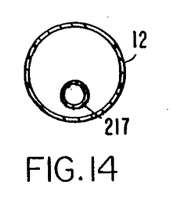
FIG. 14 is a cross-sectional view of the optical fiber cable and certain structure of the apparatus of FIGS. 10 and 11 as viewed along section line 14—14.

Referring in particular to FIGS. 1 and 2, there is illustrated an apparatus 10 configured in accordance with the present invention. The operation of apparatus 10 may be generally described as follows. A stainless steel strip 11 which pays off continuously from a source spool (not shown) enters apparatus 10 from the left. Prior to entering apparatus 10, steel strip 11 passes through tension control means (not shown) which is described further below. Steel strip 11 passes horizontally through apparatus 10 where along the way it is transformed from a flat strip to a hollow tube 12 which emerges from the right side of apparatus 10. Optical fiber 13, which pays off continuously from a source spool (or spools) via a tension control apparatus 120, as shown in FIG. 8 and described further below, enters apparatus 10 from above intermediate the left and right ends. Optical fiber 13 can be a single fiber, or as illustrated herein, can be a bundle of multiple parallel fibers. As tube 12 is formed from strip 11 within apparatus 10, optical fiber 13 is simultaneously encased therein, so that tube 12 has optical fiber 13 disposed inside of it as it emerges from the right end of apparatus 10. Thus, steel strip 11 and optical fiber 13 can be fed into apparatus 10 continuously, with steel-tube-armored optical-fiber cable 12 emerging from apparatus 10 continuously. As the source spools of steel strip and optical fiber are depleted, apparatus 10 can be stopped and replacement spools provided. The beginning of the new steel strip can be welded to the end of the previous steel strip, and likewise the beginning of the new optical fiber can be fused to the end of the previous optical fiber, by means described further below. Thus, the principal limit on the maximum length of continuous steel-tube-armored optical-fiber cable 12 is the maximum size take up spool which can be conveniently handled.

Looking at apparatus 10 in greater detail, it can be seen that strip 11 initially passes over grooved roll guide 16, between platen 17 and pressure pad 18, and over a second grooved roll guide 19. Cloth wiping pads are compressed above and below strip 11 between platen 17 and pressure pad 18 by clamp 20. The cloth wiping pads wipe dirt, metal filings and other debris from strip 11 as it enters apparatus 10.

Just to the right of roll guide 19, a nylon shut off roller 23 rides on strip 11. Shut off roller 23 is mounted on a horizontally pivoted lever arm which actuates a limit switch (not shown) whenever there is a loss of tension or breakage or termination of strip 11, thereby shutting off apparatus 10.

Strip 11 next enters an assembly of four pairs of mating upper and lower forming rollers indicated generally by reference numeral 24. As strip 11 passes between the rollers of assembly 24, its edges are bent upward into an arc, eventually to be closed into a circular tube at a point farther along in apparatus 10.

Figure 3:
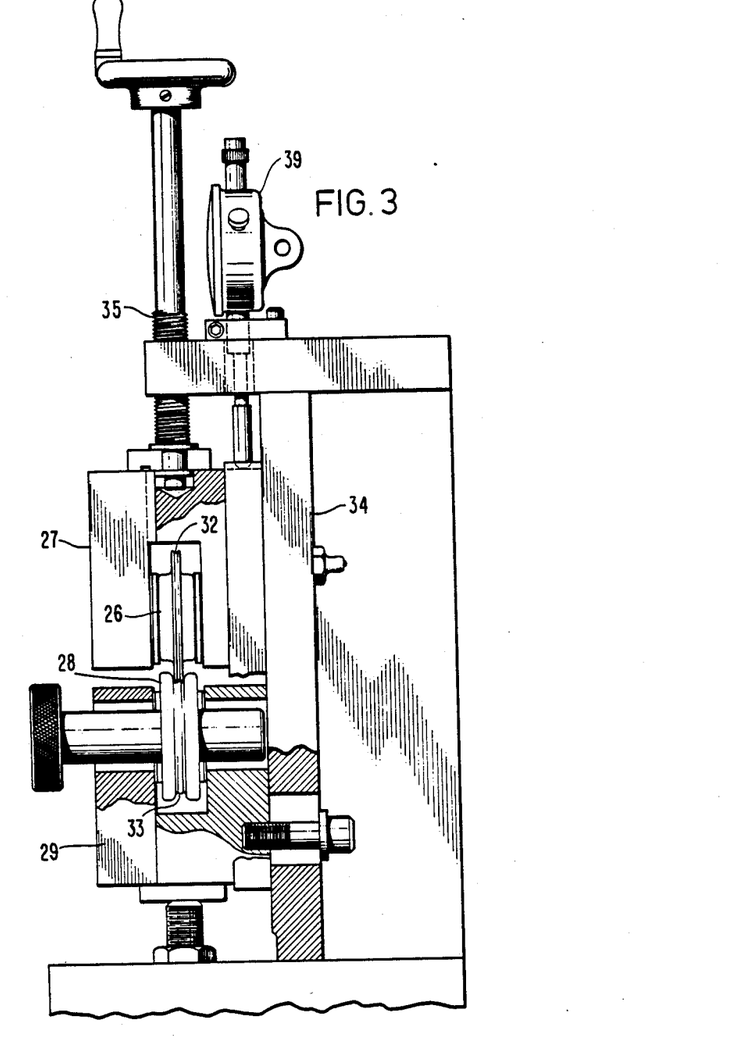
FIG. 3 is an elevational view, partially cut away, taken along the plane 3—3 of FIG. 1, and particularly showing the first upper and lower forming roller pair of the apparatus of FIGS. 1 and 2.

Referring to FIGS. 1 and 3, forming roller assembly 24 is shown as including a first roller pair 25, which includes an upper roller 26 rotatably mounted in an upper yoke 27, and a lower roller 28 rotatably mounted in a lower yoke 29. Upper roller 26 has a circumferential annular protrusion 32 which mates with a circumferential annular groove 33 in lower roller 28. Lower yoke 29 is mounted in fixed position with respect to frame 34. In contrast, upper yoke 27 is mounted in a tongue and groove arrangement with respect to frame 34 so as to be fixed horizontally, but movable vertically in sliding engagement with frame 34. The vertical position of upper yoke 27, and consequently upper roller 26, with respect to lower roller 28 is adjustable by adjustment screw 35. Micrometer 39 indicates the relative vertical position of upper yoke 27. Each of the successive roller pairs 36, 37 and 38 include upper and lower mating rollers rotatably mounted in upper and lower yokes in like fashion as roller pair 25. The only substantial difference between each of the roller pairs is in the cross-sectional shape of the individual rollers, as shown in FIGS. 4A–4D, and described below. Each of the rollers is machined from a unitary piece of metal to insure precise coaxial alignment of the forming surface and the mounting axle of each roller.

Figure 4A:
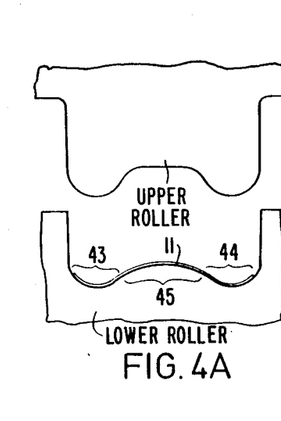
FIGS. 4A–4D are radial cross-sectional views of the mating forming surfaces of the first four upper and lower forming rollers of the apparatus of FIGS. 1 and 2.
Figure 4B:
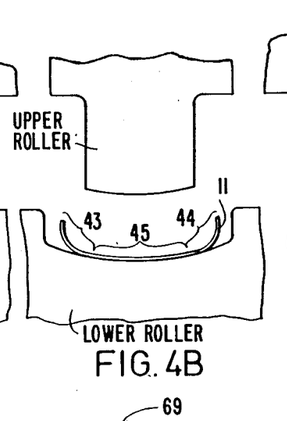
Figure 4C:
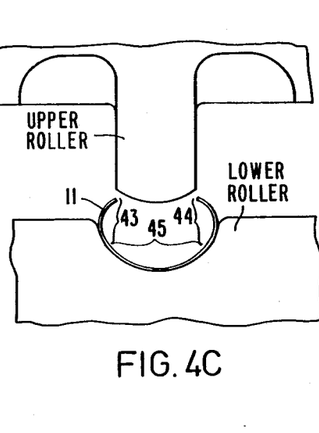

Referring to FIGS. 4A–4D, there is illustrated the relative cross-sectional shapes of the forming surfaces of mating roller pairs 25, 36, 37 and 38, respectively. The first roller pair, shown in FIG. 4A, is shaped to bend strip 11 in a double reverse curve, with the edge portions 43 and 44 being bent upward in an arc having a radius approximately equal to the desired radius of the finished tube. The center portion 45 is initially bent downward. The second roller pair, shown in FIG. 4B, reverses the curve of the center portion 45 of strip 11, causing end portions 43 and 44 to curve upwards. Successive roller pairs, shown in FIGS. 4C and 4D, respectively, reduce the radius and width of the center portion 45, causing end portions 43 and 44 to curve upwardly and inwardly, but still leaving a gap at the top.

Figure 4D:
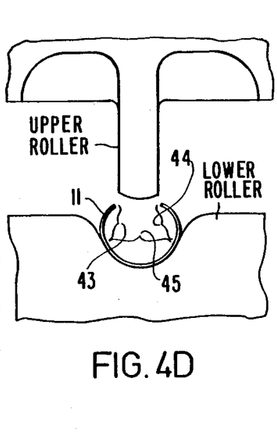

As strip 11 exits roller pair 38, it has been nearly formed into a tube, but is not yet closed at the top. At this point the tube can be closed all the way by action of additional rollers acting only on the outside of the tube. Consequently, optical fiber 13 is introduced into the partially formed tube at this point, without impeding further manipulation and formation of the tube.

Figure 5:
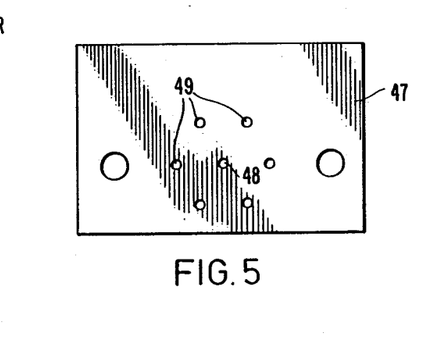
FIG. 5 is an end view of the plate of the fiber guide, particularly showing the arrangement of the guide apertures.

Guidance of the optical fibers into the partially formed steel tube is accomplished by passing the optical fiber or fibers 13 through fiber guide 46 and into the gap at the top of the partially formed tube. Fiber guide 46 includes a plate 47 at its upper end (shown best in FIG. 5) which has a central aperture 48 and six equally spaced apertures 49 located at equal radii from central aperture 48. An individual optical fiber passes through each of the seven apertures 48 and 49. Apertures 48 and 49 serve to keep the individual fibers separated to prevent tangling as they feed in from the external tension control apparatus 120. Of course, the number of optical fibers which are to be encased within the tube armor is a matter of choice, and fewer or more fibers could be accommodated by suitable redesign of the aperture plate 47. A nozzle 50 having an aperture large enough to pass the total number of optical fibers is located at the lower end of fiber guide 46. Nozzle 50 serves to cause the individual optical fibers passing through apertures 48 and 49 to be converged into close proximity so that they can pass easily through the gap at the top of the partially formed steel tube and lie within the tube as it progresses through apparatus 10.

The partially formed tube with optical fibers therein next passes between two sets of upper and lower guide rollers 54 and 55, and 56 and 57, and between two sets of side by side forming rollers 58 and 59, and 60 and 61. Rollers 54 - 61 are aligned and spaced for the purpose of stabilizing and aligning the partially formed tube with optical fibers therein prior to its entry into the the next following forming roller assembly 65. Side by side rollers 58 and 59, and 60 and 61 also provide a tube forming function in that they press the sides of the partially formed tube inward, thereby narrowing the gap at the top of the tube. Guide rollers 54 and 55, and 56 and 57 do not perform any tube forming function.

After exiting forming rollers 60 and 61, the partially formed tube enters a second assembly 65 of forming rollers where the tube is closed, fully encasing the optical fibers 13 therein. Forming roller assembly 65 is substantially identical to forming roller assembly 24 described above, except that only three roller pairs 66, 67 and 68 are employed. As in assembly 24, each of the successive roller pairs includes rollers having forming surfaces of differing cross section.

Figures 4E, 4F:
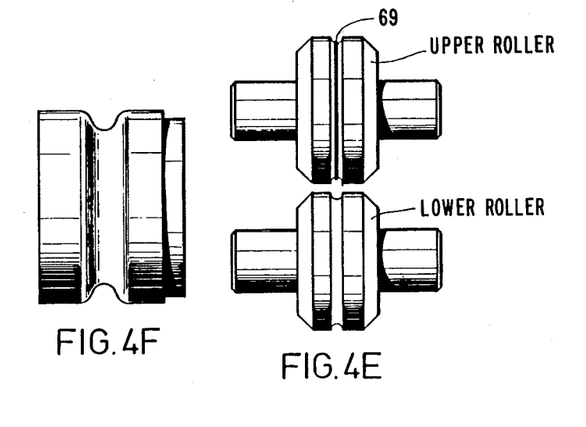
FIG. 4E is an elevational view of the upper roller and lower roller of the fifth and sixth forming roller pairs of the apparatus of FIGS. 1 and 2.
FIG. 4F is an elevational view of the upper roller of the seventh forming roller pair of the apparatus of FIGS. 1 and 2. The corresponding lower roller of the seventh roller pair is substantially similar thereto.

Referring to FIGS. 4E and 4F, the relative cross-sectional shapes of the fifth, sixth and seventh roller pairs 66-68 are illustrated. A common feature to these last three roller pairs is that both the upper and lower roller of each pair are provided with a circumferential groove, unlike the first four roller pairs which included a lower roller having a circumferential groove which mated with an upper roller having a circumferential annular protrusion. Consequently, only the outer surface of the partially formed tube is acted upon by these last three roller pairs, with the optical fibers 13 therein being protected from contact with the rollers. The fifth and sixth roller pairs 66 and 67 (general shape shown in FIG. 4E) involve similarly shaped upper and lower rollers having a circumferential groove with a transverse radius slightly larger than the final design radius of the finished tube. The transverse radii of the circumferential grooves of each successive roller pair are successively smaller. These roller pairs serve to close the gap at the top of the tube to a very narrow slit. The upper rollers of roller pairs 66 and 67 are provided with a groove-centered annular seam blade 69, which rides within the seam at the top of the newly formed tube. The seam blade 69 serves to align and steady the seam at the top center of the tube to facilitate the welding operation which follows. The seventh roller pair is shown in FIG. 4F. Because the upper and lower rollers of this last roller pair are substantially similar in shape, only the upper roller is illustrated in FIG. 4F. The upper roller of the seventh roller pair does not include an annular seam blade as do the two preceding rollers.

Upon exiting forming roller assembly 65, the newly formed tube enters welding fixture 73 (shown generally in FIG. 1 and in greater detail in FIG. 6) where the tube is steadied and supported so that the seam can be welded by laser welder 74. Laser welder 74, which is described further below, requires that the seam be precisely located at the top center of the tube and that the vertical and horizontal position of the tube be precisely located with respect to the laser welder. To satisfy these criteria, welding fixture 73 is provided with an upper roller 75 having a grooved circumferential surface for engaging the top of the tube. A lower roller 76 having a similar grooved circumferential surface engages the bottom of the tube. Lower roller 76 is mounted in a vertically movable yoke 77 which is biased upward by spring 78. By having a fixed position upper roller 75 and a spring biased lower roller 76, the top surface of the tube is maintained at a fixed vertical position with respect to the laser welder 74 despite minor fluctuations in tube diameter. The tube is maintained in horizontal alignment by virtue of the grooves in the upper and lower rollers 75 and 76, which are machined to closely fit the radius of the newly formed tube. To ensure that the seam of the tube is maintained at the top center of the tube as it passes through welding fixture 73, a thin stainless steel guide blade 78, actually a modified razor blade, is mounted ahead of upper roller 75 in a vertical plane passing through the center line of the tube. The lower edge of the guide blade 78 extends downwardly into the the seam of the tube between the abutting edges of the tube wall. The actual depth of penetration of the guide blade into the seam must be adjusted to be deep enough to prevent the blade from jumping out of the seam, yet shallow enough to avoid interference with the optical fibers within the tube.

Figures 6, 7, 9:
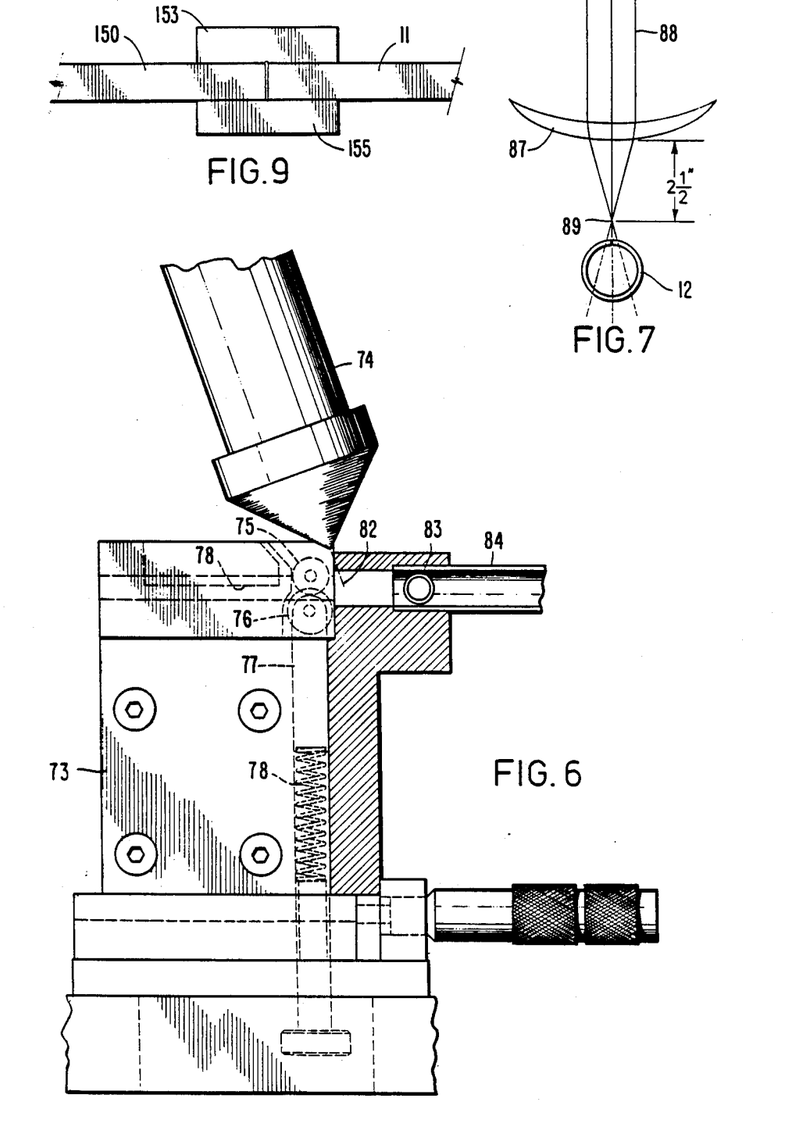
FIG. 6 is an enlarged elevational view, partially cut away, of the welding fixture of the apparatus of FIGS. 1 and 2.
FIG. 7 is a schematic representation of the relationship of the focal point of the laser beam to the tube to be welded within the welding fixture of the apparatus of FIGS. 1 and 2.
FIG. 9 is a plan view of the end portions of two lengths of steel strip as used in the apparatus of FIGS. 1 and 2, shown in the preferred arrangement for welding the strips end to end.

Laser welder 74 is located such that the laser beam exiting from the bottom end thereof impinges on the seam of the tube just to the right of upper roller 75 at point 82. As the welded tube moves to the right beyond welding point 82, it is cooled by argon gas which enters aperture 83 in the side of cooling tube 84. The argon gas displaces the air within welding fixture 73 and within the cooling tube 84, allowing the welding and cooling operation to take place in an inert atmosphere, which prevents oxidation of the weld.

Laser welder 74 preferably employs a high power slow flow carbon dioxide laser light energy source, such as that manufactured by Coherent, Inc., Palo Alto, Calif., Model No. 43. This particular laser operates at about the 500 watt level, which allows tubing having an outer diameter of 0.062 inches and a wall thickness of 0.004 inches to be welded at a rate of about 42 feet per minute. It is anticipated that with a higher power laser of about 1000 to 2000 watts, it would be possible to weld such tubing at a rate of 150-200 feet per minute.

The laser energy source itself can be located wherever convenient with respect to the welding fixture, with the laser light beam being guided to the welding fixture through a series of tubes containing mirrors. It is desirable that the final path of the laser beam be directed to the welding point 82 at an angle of about 80° with respect to the surface of the tube. Such an orientation ensures that any laser light which reflects from the surface of the tube will reflect away from laser welder 74. If the laser beam were to impinge on the tube perpendicularly thereto, the reflected laser light could pass directly back up into the laser welder and damage the laser energy source. An angle of incidence substantially less than about 80° would not be desirable because the portion of the laser energy reflected away from the surface of the tube would be increased, causing less energy to be absorbed by the tube.

The laser welding process may be more easily understood if it is noted that this is essentially a conduction type of weld as opposed to a keyhole weld. The edges of the tube wall at the seam are squarely abutting. Laser energy is deposited on the surface of the metal at the seam, with the heat conductivity of the metal being relied upon to conduct the heat through the tube wall to the bottom of the seam. The abutting edges of the tube wall at the seam are thereby caused to fuse together to effect the weld. A keyhole type of weld is to be avoided as it leaves a rougher weld line. The present welding method, if adjusted for proper heat penetration (a function of laser power and welding speed), results in a fine weld line on the exterior of the tube, with virtually no weld line on the interior surface of the tube. Yet, the tube wall is fused together through its full thickness. It is believed that laser conduction welding will work with wall thicknesses up to about 15 to 20 thousandths of an inch.

Referring to FIG. 7, there is illustrated somewhat schematically the relationship of the focus of the laser beam to the tube to be welded. FIG. 7 is not to scale, but rather has been exaggerated for clarity, as tube 12 is on the order of about 1/16th inch in diameter. A meniscus lens 87 located near the lower end of laser welder 74 causes the laser beam 88, which consists primarily of parallel rays of phase coherent light, to converge at a focal point 89 about 2½ inches below the lens. The position of laser welder 74 with respect to tube 12 is selected so that focal point 89 falls above the top surface of tube 12. If laser beam 88 were made to focus right at the surface of tube 12, the energy concentration would be too great and the metal surface of tube 12 would vaporize before the heat could be conducted all the way through the tube wall. By maintaining the laser beam slightly "out of focus," the laser energy is deposited on a greater surface area, avoiding destructively high local temperatures. It is important that the laser beam 88 be focused above the top surface of tube 12, rather than below it. If focal point 89 were below the top surface of tube 12, it would likely fall within the bore of tube 12. Then, if some of the laser light should pass through a small gap in the seam, it would focus on the optical fibers within the tube, possibly damaging them. With the present focal system, if the laser beam passes through the seam, it diverges, lessening the danger of damage to the optical fibers therein.

Referring in particular to FIG. 2, it can be seen that after the welded tube 12 exits the cooling tube 84 of welding fixture 73, it passes through a pair of upper and lower guide rollers 91 and 92, and then through an electrical induction coil flaw sensor 93 which senses discontinuities in the weld by conventional magnetic induction technique.

The tube 12 then passes through an electrical motor driven swager 94, which is a commercially available device sold by the Torrington Company of Waterbury, Conn., Model No. 100. Swager 94 has been modified so that the swaging dies can be removed with tube 12 running through it. This was necessary because swager 94 is normally used only at start up to reduce the diameter of the end portion of a new length of tubing so that the tubing 12 can be passed through the drawing dies which next follow. Once continuous production of armored optical fiber cable has begun, swager 94 is not operational. Alternatively, swager 94 can be employed continuously as the primary means of reducing the diameter of the tubing, with or without drawing dies following. It has been found that a greater reduction in diameter can be effected with the power swager than with drawing dies.

Upon exiting swager 94, tube 12 passes through die box 95 which contains two successively mounted commercially available diamond wire dies which sink the outer diameter of the tube 12 as it is pulled therethrough. This sinking process is applied only to the outer surface of the tube 12, as the tube is produced on a continuous basis and no mandrel is used. Dies such as those produced by the Ft. Wayne Wire Die Company of Ft. Wayne, Ind. are suitable. A highly chlorinated oil must be recirculated through the die box 95 to cool and lubricate the dies. A suitable oil is Aldraw J-1, available from Hangsterfer Lab, Inc., Mantua, N.J. After draw down through die box 95, tubing 12 which, prior to welding, had a diameter of about 0.062 inch and was traveling at about 42 feet per minute, now has a diameter of about 0.043 inch and is being pulled at a rate of about 60 feet per minute. The increase in linear rate of travel is due to stretching of the tube which accompanies its reduction in diameter. Because the optical fiber cannot be stretched prior to the point of draw down, the steel tubing is traveling slower than the optical fiber within it. Consequently, it is necessary that the tension in the optial fibers be independently controlled apart from the rate of pulling of the steel tube. Apparatus 120 of FIG. 8 provides this tension control function and is described further below.

Tube 12 is drawn through apparatus 10 at constant speed by wheel 98 which has a V-groove about its circumference to maintain tube 12 in horizontal alignment as it is pulled. Wheel 98 is pivotally mounted at pivot 99 and supported by turnbuckle 100. Vertical adjustment of the top of wheel 98 is accomplished by turnbuckle 100, to accommodate tubing 12 of various sizes and still maintain precise vertical alignment of tube 12. A capstan wheel 101 is spring biased against wheel 98 to keep tube 12 from jumping off of wheel 98 as it pays off onto the take up spool (not shown).

Referring in particular to FIG. 8, there is illustrated optical fiber tension control apparatus 120. Apparatus 120 is a commercially available device sold by Innovations in Optical Communications, Inc., as their Model No. OFT-7, which is designed for dispensing up to seven optical fibers from spools with constant tension control of each fiber. While detailed information on the structure and function of apparatus 120 is available from its manufacturer, a brief description of its function and application to the present invention is provided below to aid in understanding the preferred embodiment of the present invention shown herein.

Apparatus 120 is essentially a metal tube framework which supports and dispenses optical fiber from up to seven optical fiber supply reels 121, which are normally the shipping spools provided by the optical fiber manufacturer. The supply reel is secured to a drive shaft so that no slippage can take place. The drive shaft to which each spool 121 is secured is driven by a DC permanent magnet torque motor 122 through a toothed belt. The individual optical fiber 123 which pays off from spool 121 engages the surface of a chromed restraining tube 125 which acts as a guide to constrain the optical fiber 123 in the plane of the dancer assembly 127 thereabove as the fiber 123 pays off from different portions of spool 121 below. Fiber 123 is threaded through dancer assembly 127 which includes a centrally pivoted arm carrying pivotally mounted sheaves 128 and 129 on the ends thereof. Since the fiber 123 is first threaded over sheave 128 then under sheave 129, tension in fiber 123 exerts a moment on the arm of dancer assembly 127 which tends to cause a counterclockwise rotation thereof, which moment is balanced by an opposite moment generated by a coil spring (not shown) attached to the dancer arm. Thus, the angular position of the dancer arm is a function of the tension in fiber 123. A potentiometer 130 attached to the dancer arm senses the angular position of the dancer arm and provides an analog electrical feedback signal to control circuitry (not shown) for controlling the speed of motor 122. The dancer assembly 127, because it stores a length of optical fibers on its sheaves 128 and 129, and because it has a low moment of inertia, is able to rotate quickly about its central pivot to minimize snap loading of the fiber 123 under transient conditions. After fiber 123 exits the dancer assembly 127, it passes over sheave 133 and sheave 135 and, along with the other fibers from their respective supply spools and dancers, passes as optical fiber 13 into fiber guide 46 of apparatus, 10 as shown in FIG. 1.

Also shown in FIG. 8 is stainless steel strip 11 which pays off from its supply spool (not shown) mounted to the left of apparatus 120, and passes over sheave 140. It then passes through a wiping assembly 142 similar to platen 17 and pressure pad 18 described previously, where dirt and other debris are wiped from the steel strip before it passes under sheave 144 and upward to apparatus 10, as shown in FIG. 1.

It is necessary that the tension of steel strip 11 be controlled as it pays off from its supply spool. While such tension control is not as critical as that for the optical fibers provided by apparatus 120, since there is little danger of the steel strip breaking, it must still be controlled to prevent transient excessive pay off of the steel from its supply spool which could result in tangling or kinking of the steel. Consequently, a pay off mechanism is employed which is similar to the mechanism of apparatus 120 in that a dancer arm is used to provide feedback to the spool drive motor control circuitry so that tension can be maintained relatively constant. A suitable motor controller is the DC variable speed motor controller, model Velsor made by Boston Gear Ratiotrol, Boston Gear Division, Rockwell International, Quincy, Mass.

It will be readily appreciated that if the object of producing armored optical fiber cable on a continuous basis is to be achieved, means for joining a new spool of steel strip to the end of the previous one must be provided. The present invention contemplates arranging the strips to be joined so that their ends are squarely abutting, and welding the joint by means of the same laser welding process employed for welding the tubing seam. A separate welding jig is provided for holding the new strip 150 in abutment with the previous strip 11 in the manner shown in FIG. 9. It should be noted that two short lengths of similar strip 153 and 155 are held on each side of the weld site in engagement with the strips to be joined. Strips 153 and 155 serve the purpose of allowing uniform welding all the way to the edge of the strips to be joined, by eliminating the boundary condition that would otherwise exist at the edge of strips 11 and 150. Thus, heat dissipation about the weld line is uniform in all directions. Without strips 153 and 155 in place during welding, the laser would tend to vaporize the edges of the strips 11 and 150 at the ends of the weld line. After the weld is completed, strips 153 and 155 will be "tack" welded to strips 11 and 150 at the ends of the weld line. They can, however, be merely broken off and the ends of the weld line smoothed with a file, leaving a smooth uniform weld line across the strips from edge to edge. As in the previously described laser welding of the tubing seam, the weld site at the ends of the strips to be joined is bathed in a stream of argon gas to prevent oxidation and for cooling.

Joining a new spool of optical fiber to the end of the previous fiber is also necessary to allow production of continuous lengths of armored optical fiber cable. The technology for fusing optical fibers end to end is known and commercially available. One commercially available device which is believed to be suitable is the FSM-20 optical fiber splicer made by Fujikura Ltd. of Japan. It is also necessary to test the joined fibers for the quality of the fusion and to test complete cables to insure continuity of all the fibers from end to end. Such technology is also known and commercially available. Devices which are believed to be suitable are the Anritsu MW98A Optical Time Domain Reflectometer or the optical time domain reflectometers made by Laser Precision Corporation, 1231 Hart St., Utica, N.Y. 13502. Optical time domain reflectometers inject a light pulse into the optical fiber at one end and measure the time interval in which the light is reflected back, thereby permitting calculation of the location of the end of the fiber, or the location of a fault or faulty splice, which will also cause reflections.

Another aspect of the present invention involves a modification to the embodiment of FIGS. 1 and 2, in which the motive force for directing the optical fiber 13 into the tube 12 involves pushing the optical fiber rather than pulling it. In the embodiment of FIGS. 1 and 2, the optical fiber 13 is pulled along with metal strip 11 by capstan 98 against a slight back tension provided by optical fiber tension control apparatus 120. Due to this slight tension, the optical fiber 13 tends to hug the inner wall of the tube 12 as tube 12 passes around the curvature of capstan 98. After tube 12 is straightened, optical fiber 13 can end up being slightly shorter than the tube 12, which effect becomes more pronounced with armor tubes of greater diameter. With tubes of relatively small diameter, where the difference in radii between the inner wall and outer wall is small as the tube wraps around the capstan 98, the problem is made up for by shrinkage of the metal tube as the weld heat dissipates. For example, a tube of 0.044 inch diameter with a single optical fiber therein will end up with the optical fiber being about 0.2% longer than the tube, thus avoiding strain in optical fiber in the finished optical fiber cable. In a larger diameter tube, however, where the difference in inner and outer radii is greater and the relative shrinkage of the metal tube after welding is less, the relative lengths of the optical fiber and tube can reverse, with the optical fiber ending up about 0.5% short.

To counteract this effect, the optical fiber can be blown into the metal tube with an inert gas by means of viscous drag so that the optical fiber hugs the outer wall of the tube as it passes around the curvature of capstan 98. Hence, when the tube is straightened, the optical fiber ends up being up to 2.5% longer than the tube, depending on the tube diameter, the optical fiber thereby taking on a sinusoidal disposition within the tube.

Referring to FIGS. 10-14, there is illustrated a second embodiment of the present invention incorporating the above-mentioned aspect of the invention. Those elements which are common to the first embodiment described above are indicated by like reference numerals, whereas different structures are indicated by 200 series reference numerals. Manifold 210 is mechanically secured to apparatus 10 by bracket 211. A small diameter tube 212 is anchored to manifold 210 and extends therefrom parallel to metal strip 11 and the first assembly of roller pairs 24. Tube 212 receives optical fiber 13 through fitting 213 on manifold 210, and also receives argon gas under pressure through fitting 214 on manifold 211. The argon gas flows to the right through tube 212 and pushes optical fiber 13 along via viscous drag. Tube 212 enters the gap at the top of the partially formed tube at point 215 after the first assembly of forming rollers but before the guide rollers 54-60, and second roller assembly 65. Therebeyond, tube 212 extends within tube 12 to about the top of capstan 98, that is, to about the point indicated by section line 13—13. The argon gas exiting the tube 212 at the right end thereof blows the optical fiber 13 tangentially against the outer wall of tube 12, where the optical fiber remains as tube 12 wraps around capstan 98. The spent argon gas flows back to the left between tube 212 and tube 12 past welding station 73, thereby serving the additional function of bathing the interior of tube 12 in inert gas at the point of welding.

A further aspect of the second embodiment of the present invention is also illustrated in FIGS. 10-14, which involves injecting a thixotropic gel into the formed tube 12 after the optical fiber 13 is in place. A second tube 217 runs parallel to tube 212 on the opposite side of roller assembly 24 and emanates from manifold 211 in a manner similar to tube 212. Tubes 212 and 217 are not in communication at manifold 211, however. Thixotropic gel can be injected at fitting 218 of manifold 211 and passed through tube 217 which enters tube 12 at approximately the same point as tube 212 and thereafter runs along parallel thereto within tube 12. Unlike tube 212, however, tube 217 extends beyond the top of capstan 98 and curves around capstan 98 to about the point indicated by section line 14-14, where the gel enters tube 12 downstream from optical fiber 13, to provide a cushioning material to hold optical fibers 13 in place within tube 12. Tube 217 ends at a point about 90° around capstan 98 and is located vertically beneath tube 212 to avoid impeding the blowing action of the argon gas as it exits tube 212.

While the preferred embodiment of the invention has been illustrated and described in some detail in the drawings and foregoing description, it is to be understood that this description is made only by way of example to set forth the best mode contemplated of carrying out the invention and not as a limitation to the scope of the invention which is pointed out in the claims below. For instance, operation of the apparatus disclosed herein has been described with respect to the formation of tubing having an initial diameter of about 0.062 inch and a diameter of about 0.043 inch after draw down. This size tubing is just an example as various sizes of tubing up to about 0.25 inch diameter can be produced by the apparatus and method of the present invention.

What is claimed is:

1. An apparatus for continuous manufacture of optical fiber cable in which optical fiber is encased by an hermetically sealed homogeneous metal tube formed from flat metal strip, said apparatus comprising:
    a first metal forming means for forming a flat metal strip into a partially closed tube having a longitudinal gap at the top thereof;
    an optical fiber guide means for inserting at least one optical fiber into said longitudinal gap in said tube;
    a second metal forming means for forming said partially closed tube into a substantially completely closed tube in which the edges of the formerly flat metal strip abut at a seam at the top of the tube;
    a laser welding station having a means for applying a beam of laser light onto the abutted edges of said seam at a location where said optical fiber lies within the tube adjacent the seam without heat shielding intermediate the optical fiber, and said laser welding station also having a means for focusing said beam of laser light such that the focal point is located above the surface of the seam so that any laser light which passes through said seam into said tube will diverge, thereby lessening the risk of damage to the optical fiber within the tube while welding said abutted edges together; and
    means for continuously conveying said tube through said laser welding station.

2. The apparatus of claim 1, in which said laser welding station includes a thin guide blade received within the seam of said tube before welding for maintaining said seam at top center of said tube during welding.

3. The apparatus of claim 1, and further including fiber tension control means for paying the fiber into said optical fiber guide means at constant tension.

4. The apparatus of claim 3, wherein said fiber tension control means includes drive motor control of the feed rate of said fiber and said fiber passes over a dancer assembly with position sensing means for providing feedback to said feed rate drive motor.

5. The apparatus of claim 1, and further including a sinking station located past said laser welding station for reducing the outer diameter of said tube after welding.

6. The apparatus of claim 1, in which said means for applying a beam of laser light includes means for directing the beam at an angle of incidence to said seam of approximately 80°.

7. The apparatus of claim 1, in which said means for applying a beam of laser light includes means for adjusting the power level of said beam in relation to the thickness of said tube in order to weld said seam without a weld line on the inner surface of said tube.

8. A process for continuous manufacture of optical fiber cable in which optical fiber is encased by an hermetically sealed homogeneous metal tube formed from flat metal strip, comprising the steps of:
    passing the metal strip through a first metal forming means that transforms the metal strip into a partially formed tube with a longitudinal gap at the top thereof;
    guiding optical fiber through the gap of said partially formed tube to lie within the partially formed tube;
    passing the partially formed tube with optical fiber therein through a second metal forming means that transforms the partially formed tube into a substantially completely formed tube having a seam with abutted edges at the top thereof; and
    directing a beam of laser light onto the abutted edges of the tube seam as said seam in conveyed through the beam at a location where said optical fiber lies within the tube adjacent the seam without heat shielding intermediate the optical fiber and the abutting edges of said seam, wherein the beam of laser light is focused such that the focal point is located above the surface of the seam, for conduction welding the seam together without filler metal, thereby creating a homogeneous tube having an hermetically sealed seam with optical fiber within the tube.

* * * * *